US012123648B2

(12) United States Patent
Webster

(10) Patent No.: US 12,123,648 B2
(45) Date of Patent: Oct. 22, 2024

(54) PELLET PROCESSING DRUM

(71) Applicant: Pelleton Global Renewables Ltd., Tortola (VG)

(72) Inventor: John Webster, St. Lucia (AU)

(73) Assignee: Pelleton Global Renewables Ltd., Tortola (VG)

( * ) Notice: Subject to any disclaimer, the term of this patent is extended or adjusted under 35 U.S.C. 154(b) by 503 days.

(21) Appl. No.: 17/416,700

(22) PCT Filed: Dec. 20, 2019

(86) PCT No.: PCT/AU2019/051424
§ 371 (c)(1),
(2) Date: Jun. 21, 2021

(87) PCT Pub. No.: WO2020/124164
PCT Pub. Date: Jun. 25, 2020

(65) Prior Publication Data

US 2022/0057139 A1 Feb. 24, 2022

(30) Foreign Application Priority Data

Dec. 20, 2018 (AU) ................................ 2018904876

(51) Int. Cl.

| | |
|---|---|
| ***F26B 11/18*** | (2006.01) |
| ***F26B 3/06*** | (2006.01) |
| ***F26B 5/16*** | (2006.01) |
| ***F26B 11/04*** | (2006.01) |

(52) U.S. Cl.
CPC .............. *F26B 11/181* (2013.01); *F26B 3/06* (2013.01); *F26B 5/16* (2013.01); *F26B 11/0436* (2013.01)

(58) Field of Classification Search
CPC .. F26B 11/181; F26B 3/06; F26B 5/16; F26B 11/0436; F26B 11/04; F26B 25/16; F26B 3/02; F26B 11/0481
See application file for complete search history.

(56) References Cited

U.S. PATENT DOCUMENTS 3,469,324 A * 9/1969 Vissers ................ F26B 11/188 34/392
4,003,136 A 1/1977 Vincent et al.
4,177,575 A * 12/1979 Brooks .............. F26B 11/0459 366/147

(Continued)

FOREIGN PATENT DOCUMENTS

| | | | | |
|---|---|---|---|---|
| CN | 104764345 A | | 7/2015 | |
| JP | 2005111464 A | * | 4/2005 | |
| WO | WO-2018092864 A1 | * | 5/2018 | .......... B01J 13/0065 |

OTHER PUBLICATIONS

Translation, JP-2005111464-A, Apr. 2005 (Year: 2005).*

(Continued)

*Primary Examiner* — Jessica Yuen
(74) *Attorney, Agent, or Firm* — Greenberg Traurig, LLP; David J. Dykeman; Joshua I. Rudawitz

(57) ABSTRACT

The present invention relates to a desiccation apparatus, the apparatus comprising: a hollow drum mounted for revolution about a substantially longitudinal axis, the drum comprising a shell having an interior surface and an exterior surface; and a means to generate airflow through the hollow drum.

18 Claims, 2 Drawing Sheets

(56) References Cited

U.S. PATENT DOCUMENTS 4,854,941 A * 8/1989 Chedgy .................... C10L 9/08
44/629
5,412,881 A * 5/1995 Romweber ........... F26B 11/028
432/105

OTHER PUBLICATIONS

Translation, WO-2018092864-A1, May 2018 (Year: 2018).*
International Search Report in PCT International Application No. PCT/AU2019/051424 mailed Mar. 11, 2020.

* cited by examiner

PELLET PROCESSING DRUM

CROSS-REFERENCE TO RELATED APPLICATIONS

This application is a U.S. national phase application of PCT International Patent Application No. PCT/AU2019/051424, filed on Dec. 20, 2019, which claims the benefit of and priority to Australian Application No. 2018904876, filed on Dec. 20, 2018, the contents of each of which are incorporated herein in their entireties.

TECHNICAL FIELD

The present invention relates to a desiccation apparatus. More preferably, the desiccation apparatus of the present invention is adapted to remove water from a wet feedstock of discrete particles.

BACKGROUND ART

The following discussion of the background art is intended to facilitate an understanding of the present invention only. The discussion is not an acknowledgement or admission that any of the material referred to is or was part of the common general knowledge as at the priority date of the application.

Many different types of dryers are used for removing water from feedstocks. The most common type of dryer is a direct, or convection, dryer. Direct dryers feature a direct contact between the feedstock and hot gases. The hot gases then carry away the water evaporating from the feedstock. Typically, direct dryers incorporate a rotating drum to agitate the feedstock. An alternative dryer is a contact dryer, which directly contacts the feedstock with a heated surface to evaporate water therefrom. As each of these processes rely on heating, they are typically quite energy intensive. Such processes are unsuited to the processing of low value materials where the efficiency in terms of energy required per litre of water evaporated is a key consideration.

Throughout this specification, unless the context requires otherwise, the word “comprise” or variations such as “comprises” or “comprising”, will be understood to imply the inclusion of a stated integer or group of integers but not the exclusion of any other integer or group of integers.

SUMMARY OF INVENTION

In accordance with the present invention, there is provided a desiccation apparatus, the apparatus comprising:

- a hollow drum mounted for revolution about a substantially longitudinal axis, the drum comprising a shell having an interior surface and an exterior surface; and
- a means to generate airflow through the hollow drum.

Preferably, the desiccation apparatus is adapted to remove water and/or other liquids from a wet feedstock, thereby reducing the liquid content of the feedstock. The inventors have found that the airflow generated through the drum will enhance the rate of evaporation of the water or other volatile liquids from the wet feedstock. Without wishing to be bound by theory, the inventors believe that as water evaporates into the atmosphere of the desiccation apparatus as water vapour, the airflow will continually direct the water vapour out of the desiccation apparatus. This is understood to increase the rate of evaporation of water from the wet feedstock whilst also preventing the recondensation of water vapour.

Throughout this specification, unless the context requires otherwise, the term “dried material” or variations, will be understood to refer to a feedstock that has been treated to remove at least a portion of its liquid content. It should not be understood to refer exclusively to a material that has no liquid content.

In one form of the present invention, the apparatus further comprises a liner provided on at least a portion of the interior surface. Preferably, the liner is constructed from a non-stick material. In one form of the present invention, the liner is constructed from a material selected from the group comprising textiles, fabrics, rubbers, plastics, ceramics, wood, cement, concrete or brick. Preferably, the where the liner is plastic it is high density polyethylene (HDPE). The use of the liner has been found to prevent the feedstock materials from sticking to the internal surface of the desiccation drum. Accordingly, the desiccation apparatus of this form of the invention is particularly useful in drying sticky, or tacky, materials such as sewage sludge and wet biomass.

In a preferred form of the present invention, the liner is a porous liner.

Throughout this specification, unless the context requires otherwise, the term “porous liner” or variations, will be understood to refer to a material that comprises a plurality of pores or interstices that admit the passage or diffusion of gas and liquid therethrough.

The inventors have also found that by lining at least a portion of the interior of the hollow drum with a porous liner, the removal of the water from the feedstock is enhanced. It is understood by the inventors, that when the porous liner is brought into contact with liquid in the feedstock, the porous liner will absorb liquid due to capillary forces. The capillary force generates suction that absorbs liquids from the feedstock into the porous liner. When wet portions of the porous liner come out of contact with the feedstock, liquids absorbed by the porous liner are free to evaporate from the porous liner. The evaporation is enhanced as a result of the airflow being generated through the hollow drum.

The use of the porous liner has also been found to limit the feedstock materials from sticking to the internal surface of the desiccation drum.

In one form of the present invention, the shell is provided with a number of perforations. It is envisaged that the perforations provide locations for air, liquids and liquid vapour to exit the hollow drum. In embodiments where a porous liner is used, the perforations are in communication with the pores of the porous liner, thereby allowing evaporation of water from the porous liner out through the perforations on the exterior of the hollow drum, whilst still retaining the feedstock within the hollow drum. The inventors have found that the rotation of the drum also induces an airflow on the exterior of the drum. Where the hollow drum comprises perforations, this airflow will contact the porous liner. This airflow will act to increase evaporation of water from the porous liner. A build-up of liquids in the porous liner will also lead to liquids exiting the drum through the perforations under the influence of gravity.

In one form of the present invention, the porous liner is constructed from a material selected from the group comprising porous textiles, porous fabrics, porous rubbers, porous plastics, porous ceramics, porous wood, porous cement, porous concrete or porous brick. Preferably, the porous liner is a woven or non-woven textile. More preferably, the porous liner is a synthetic textile. Still preferably, the porous liner is a geosynthetic textile.

As would be appreciated by a person skilled in the art, synthetic textiles are textiles that consist of synthetic fibres. These synthetic fibres are typically made into flexible, porous fabrics by standard weaving machinery or are matted together in a random non-woven manner. The inventors have found that geosynthetic textiles, or geotextiles, are particularly useful for use as the porous liner. Geosynthetic textiles are porous to liquid flow across their manufactured plane and also within their thickness. Such fabrics are designed to have an increased surface area to generate large capillary forces. The capillary force can generate suction that absorbs water from the feed material through the fibre channels.

Preferably, the porous liner is constructed from synthetic fibres. Preferably, the synthetic fibres are constructed from a polymeric material. More preferably the synthetic fibres are constructed from one or more of polypropylene, polyester, polyethylene and high density polyethylene (HDPE).

As described above, the liner may be porous. In one embodiment, the size of the pores is between 1 microns and 100 microns. In one embodiment, the size of the pores is between 1 microns and 90 microns. In one embodiment, the size of the pores is between 1 microns and 80 microns. In one embodiment, the size of the pores is between 1 microns and 70 microns In one embodiment, the size of the pores is between 1 microns and 60 microns. In one embodiment, the size of the pores is between 1 microns and 50 microns. In one embodiment, the size of the pores is between 1 microns and 40 microns. In one embodiment, the size of the pores is between 1 microns and 30 microns. In one embodiment, the size of the pores is between 1 microns and 25 microns. In one embodiment, the size of the pores is between 1 microns and 20 microns. In one embodiment, the size of the pores is between 1 microns and 15 microns. In one embodiment, the size of the pores is between 1 microns and 10 microns. As would be appreciated by a person skilled in the art, the pores are preferably sized to provide the required capillarity or surface tension to retain liquid in the pores of the porous layer for subsequent evaporation.

In one form of the present invention the feedstock is selected from the group comprising pellets, powders, seeds, biomass matter, muds, sludges, lumps, slurry, suspensions, ores, concentrates and agglomerates. The inventors have found the desiccation apparatus of the present invention to be particularly useful for use in the drying of a feedstock containing pelletised or agglomerated materials. The IUPAC Compendium of Chemical Terminology, 2nd ed. (the "Gold Book") defines agglomeration as the process in which dispersed molecules or particles assemble rather than remain as isolated single molecules or particles. Throughout this specification, unless the context requires otherwise, the term "agglomerate" or variations of such, will be understood to refer to an assemblage of discrete particles that are adhered together such that they behave as a single larger particle.

Preferably, the hollow drum is cylindrical. Alternatively, the hollow drum comprises a number of flat faces formed into a polygonal tube or drum.

As discussed above, the hollow drum mounted for revolution about a substantially longitudinal axis. The longitudinal axis is defined as being parallel to elongate length at an approximate centre on the interior of the shell. As would be appreciated by a person skilled in the art, the rotation about the longitudinal axis ensures symmetrical rotation. It is understood by the inventors that variances of less than 5° from longitudinal axis of the drum are preferred. More preferably, the variance is less than 4° from longitudinal axis of the drum. More preferably, the variance is less than 3° from longitudinal axis of the drum. More preferably, the variance is less than 2° from longitudinal axis of the drum. More preferably, the variance is less than 1° from longitudinal axis of the drum.

In one form of the present invention, the drum is elongate in the horizontal axis. Preferably, the ratio of the diameter of the drum to the length of the drum is between 1:2.5 and 1:10.

In one form of the present invention, the length of the drum is at least 3 metres. In one form of the present invention, the length of the drum is at least 4 metres. In one form of the present invention, the length of the drum is at least 5 metres. In one form of the present invention, the length of the drum is at least 6 metres. In one form of the present invention, the length of the drum is at least 7 metres. In one form of the present invention, the length of the drum is at least 8 metres. In one form of the present invention, the length of the drum is at least 9 metres. In one form of the present invention, the length of the drum is at least 10 metres. In one form of the present invention, the length of the drum is at least 11 metres. In one form of the present invention, the length of the drum is at least 12 metres. In one form of the present invention, the length of the drum is at least 13 metres. In one form of the present invention, the length of the drum is at least 14 metres. In one form of the present invention, the length of the drum is at least 15 metres. In one form of the present invention, the length of the drum is at least 16 metres. In one form of the present invention, the length of the drum is at least 17 metres. In one form of the present invention, the length of the drum is at least 18 metres. In one form of the present invention, the length of the drum is at least 19 metres. In one form of the present invention, the length of the drum is at least 20 metres.

In one form of the present invention, the diameter of the drum is at least 0.5 meters. In one form of the present invention, the diameter of the drum is at least 1 meters. In one form of the present invention, the diameter of the drum is at least 1.5 meters. In one form of the present invention, the diameter of the drum is at least 2 meters. In one form of the present invention, the diameter of the drum is at least 2.5 meters. In one form of the present invention, the diameter of the drum is at least 3 meters. In one form of the present invention, the diameter of the drum is at least 3.5 meters. In one form of the present invention, the diameter of the drum is at least 4 meters. In one form of the present invention, the diameter of the drum is at least 4.5 meters. In one form of the present invention, the diameter of the drum is at least 5 meters.

In one form of the present invention, the shell may comprise multiple shell layers. Preferably, the one or more inner layers are perforated. In one form of the present invention, the outer layer is solid. In an alternative form of the present invention, the outer layer is perforated.

In one form of the present invention, the perforations have a diameter of from about 1 mm to about 150 mm. In a preferred form of the present invention, the perforations have a diameter of from about 50 mm to 100 mm. It is understood by the inventors that the size of the perforation should be large enough to provide the porous liner with sufficient contact area with the exterior atmosphere. The size is however limited by reduced support the larger perforations provide the porous liner.

Preferably, a number of perforations are provided around the circumference of the hollow drum.

Preferably, a number of perforations are provided along the length of the hollow drum.

In embodiments where the desiccation apparatus comprises one or more perforated shells, the perforations occupy at least 10% of at least one perforated shell. In a preferred form of the present invention, the perforations occupy between 10% and 80% of at least one perforated shell. In a preferred form, the perforations occupy between 20% and 70% of at least one perforated shell. In a preferred form, the perforations occupy between 30% and 60% of the shell. In a preferred form, the perforations occupy about 40% of at least one perforated shell. As would be appreciated by a person skilled in the art, the coverage of the perforations is limited by the structural integrity of the shell.

In a preferred form of the invention, the thickness of the liner is between 1 mm and 20 mm. In one embodiment, the thickness of the liner is between 2 mm and 9 mm. In one embodiment, the thickness of the liner is between 3 mm and 8 mm. In one embodiment, the thickness of the liner is between 3 mm and 7 mm. In one embodiment, the thickness of the liner is between 3 mm and 8 mm. In one embodiment, the thickness of the liner is between 5 mm and 20 mm. In one embodiment, the thickness of the liner is between 6 mm and 20 mm. In one embodiment, the thickness of the liner is between 7 mm and 20 mm. In one embodiment, the thickness of the liner is between 8 mm and 20 mm. In one embodiment, the thickness of the liner is between 9 mm and 20 mm. In one embodiment, the thickness of the liner is between 10 mm and 20 mm. It is understood by the inventors that if the thickness of the liner is too thin, the liner is susceptible to damage from abrasive materials in the feedstock. Furthermore, denser feedstocks will require thicker liners.

In one form of the present invention, the liner is made up of two or more layers.

In one form of the present invention, where each layer is made up of two or more layers, the thickness of each layer is between 1 mm and 10 mm. In a preferred form of the present invention, the thickness of each layer is between 2 mm and 9 mm. In a preferred form of the present invention, the thickness of each layer is between 3 mm and 8 mm. In a preferred form of the present invention, the thickness of each layer is between 3 mm and 7 mm. In a preferred form of the present invention, the thickness of each layer is between 2 mm and 8 mm.

In a preferred form of the invention, the liner covers at least 50% of the interior surface. In a preferred form of the invention, the liner covers at least 55% of the interior surface. In a preferred form of the invention, the liner covers at least 60% of the interior surface. In a preferred form of the invention, the liner covers at least 65% of the interior surface. In a preferred form of the invention, the liner covers at least 70% of the interior surface. In a preferred form of the invention, the liner covers at least 75% of the interior surface. In a preferred form of the invention, the liner covers at least 80% of the interior surface. In a preferred form of the invention, the liner covers at least 85% of the interior surface. In a preferred form of the invention, the liner covers at least 90% of the interior surface. In a preferred form of the invention, the liner covers at least 95% of the interior surface.

In one embodiment of the present invention, a protective layer comprising a number of apertures is provided on the surface of the liner. In some applications where the feedstock comprises abrasive particles, the protective layer is used to prevent or inhibit the abrasive particles from damaging the liner, whilst still permitting the egress of water, vapours or fumes to the liner. Preferably, the protective layer is constructed from an abrasion resistant material. More preferably, the abrasion resistant material is selected from the group comprising rubber, neoprene or steel.

Preferably, the apertures of the protective layer are between 10 mm and 50 mm.

In one form of the present invention, the desiccation apparatus further comprises a feed inlet. Preferably the feed inlet is in communication with the interior of the hollow drum. More preferably, the feed inlet is located at an end of the hollow drum.

In one embodiment, both ends of the hollow drum are capped. In an alternative embodiment, one end of the hollow drum is capped and the other end of the hollow drum is partially capped. In an alternative embodiment, both ends of the hollow drum are partially capped. The inventors have found that by partially capping the end of the drum, the feed material may be held within the drum whilst still allowing airflow through the drum. Preferably, the capping extends radially from the shell. In this arrangement, a central bore of the hollow drum remains uncapped. The inventors have found that this arrangement may be used to control the volume of feedstock retained within the hollow drum. It is envisaged that the material will only exit the capped end once there is sufficient volume to reach the central bore. The volume can in turn be controlled by adjusting the feed rate.

In one form of the present invention, the desiccation apparatus further comprises an outlet. Preferably, the outlet is adapted to discharge the dried material. More preferably, the outlet is distal to the feed inlet. In one form of the present invention, the outlet has a smaller diameter than the desiccation drum. Preferably, the dried product discharges into the outlet as an overflow. Alternatively, the outlet comprises a positive discharge system of screws, lifters or ports in the end of the drum.

In one form of the present invention, multiple drums are operated in series.

In one form of the present invention, multiple drums are operated in parallel.

Preferably, the hollow drum is mounted on a base. More preferably, the hollow drum is mounted one or more rollers provided on the base. Still preferably, the one or more rollers permit the revolution of the hollow drum about a substantially horizontal axis.

In one form of the present invention, the desiccation apparatus further comprises a rotating means for controllably rotating the hollow drum. Preferably, the rotating means is selected from gear, belt, roller drive axle or tyre drive mechanisms. In one form of the present invention, where multiple desiccation apparatus are used in parallel, adjacent hollow drums may be used as the rotating means.

Preferably, the rotation of the drum is driven by a drive means. More preferably, the drive means is selected from the group comprising combustion motors, electric motors, hydraulic motors and prime mover direct drives.

In one form of the present invention, one or more teeth tracks are provided around the exterior of the hollow drum. Preferably the one or more teeth tracks are adapted to engage with a gear that is coupled to the drive motor. In one form of the present invention, the gear is directly coupled with the drive motor. In an alternative form of the present invention, the gear is coupled with the gear by way of a chain or belt.

In one form of the present invention, the means for generating airflow through the hollow drum is a fan or air blower. Preferably, where a fan or air blower is used, the direction of the airflow is parallel to the elongate axis of the drum.

In an alternative form of the present invention, the means for generating airflow through the hollow drum is generated by a differential pressure between the interior of the hollow drum and the exterior. Preferably a vacuum or suction device is used to cause the differential pressure.

In one form of the present invention the airflow is at atmospheric temperature. In an alternative form of the present invention, the airflow is heated. In an alternative form of the present invention, the airflow is cooled.

In one embodiment, the temperature of the airflow is less than 100° C. In one embodiment, the temperature of the airflow is less than 90° C. In one embodiment, the temperature of the airflow is less than 80° C. In one embodiment, the temperature of the airflow is less than 70° C. In one embodiment, the temperature of the airflow is less than 60° C. In one embodiment, the temperature of the airflow is less than 50° C. In one embodiment, the temperature of the airflow is less than 40° C. In one embodiment, the temperature of the airflow is less than 30° C. In one embodiment, the temperature of the airflow is less than 25° C.

In one form of the present invention the speed of the airflow is at least 2 km/hr. In a preferred form of the invention, the airflow is at least 3 km/hr. In a preferred form of the invention, the airflow is at least 4 km/hr. In a preferred form of the invention, the airflow is at least 5 km/hr. In a preferred form of the invention, the airflow is at least 6 km/hr. In a preferred form of the invention, the airflow is at least 7 km/hr. In a preferred form of the invention, the airflow is at least 8 km/hr. In a preferred form of the invention, the airflow is at least 9 km/hr. In a preferred form of the invention, the airflow is at least 10 km/hr.

In a preferred form of the invention, the airflow is between 2 km/hr and 20 km/hr. In a preferred form of the invention, the airflow is between 4 km/hr and 19 km/hr. In a preferred form of the invention, the airflow is between 6 km/hr and 18 km/hr. In a preferred form of the invention, the airflow is between 8 km/hr and 17 km/hr. In a preferred form of the invention, the airflow is between 10 km/hr and 16 km/hr.

In one embodiment, the airflow is passed through the drum at a rate of at least 2.5 $m^3/s$. In one embodiment, the airflow is passed through the drum at a rate of at least 3 $m^3/s$. In one embodiment, the airflow is passed through the drum at a rate of at least 4 $m^3/s$. In one embodiment, the airflow is passed through the drum at a rate of at least 5 $m^3/s$. In one embodiment, the airflow is passed through the drum at a rate of at least 6 $m^3/s$. In one embodiment, the airflow is passed through the drum at a rate of at least 7 $m^3/s$. In one embodiment, the airflow is passed through the drum at a rate of at least 8 $m^3/s$. In one embodiment, the airflow is passed through the drum at a rate of at least 9 $m^3/s$. In one embodiment, the airflow is passed through the drum at a rate of at least 10 $m^3/s$. In one embodiment, the airflow is passed through the drum at a rate of at least 11 $m^3/s$. In one embodiment, the airflow is passed through the drum at a rate of at least 12 $m^3/s$. In one embodiment, the airflow is passed through the drum at a rate of at least 13 $m^3/s$. In one embodiment, the airflow is passed through the drum at a rate of at least 14 $m^3/s$. In one embodiment, the airflow is passed through the drum at a rate of at least 15 $m^3/s$. In one embodiment, the airflow is passed through the drum at a rate of at least 16 $m^3/s$. In one embodiment, the airflow is passed through the drum at a rate of at least 17 $m^3/s$. In one embodiment, the airflow is passed through the drum at a rate of at least 18 $m^3/s$. In one embodiment, the airflow is passed through the drum at a rate of at least 19 $m^3/s$. In one embodiment, the airflow is passed through the drum at a rate of at least 20 $m^3/s$. In one embodiment, the airflow is passed through the drum at a rate of at least 21 $m^3/s$. In one embodiment, the airflow is passed through the drum at a rate of at least 22 $m^3/s$. In one embodiment, the airflow is passed through the drum at a rate of at least 23 $m^3/s$. In one embodiment, the airflow is passed through the drum at a rate of at least 24 $m^3/s$. In one embodiment, the airflow is passed through the drum at a rate of at least 25 $m^3/s$. In one embodiment, the airflow is passed through the drum at a rate of at least 26 $m^3/s$. In one embodiment, the airflow is passed through the drum at a rate of at least 27 $m^3/s$. In one embodiment, the airflow is passed through the drum at a rate of at least 28 $m^3/s$. In one embodiment, the airflow is passed through the drum at a rate of at least 29 $m^3/s$. In one embodiment, the airflow is passed through the drum at a rate of at least 30 $m^3/s$.

In one embodiment, the drum is mounted in a decline position. Preferably, the drum is declined from the inlet to the outlet. In one embodiment, the decline is between about 1° and 20°. The declined arrangement has been found to cause the feedstock to move down the horizontal axis of the hollow drum during operation. If the decline is too steep, the feedstock will not spend sufficient time in the hollow drum. Alternatively, the drum comprises progressively larger drum sections.

In one form of the present invention, the hollow drum further comprises one or more screens to allow for undersize/oversize particles to be removed from the stream.

In one form of the present invention, the apparatus further comprises a drainage means in communication with the perforations. Preferably, the draining means comprises a sump. More preferably, the sump comprises a drain outlet. Still preferably, the drain outlet comprising a pump During operation of the desiccation apparatus, the feedstock is gently tumbled in the hollow drum as it rotates. Without wishing to be bound by theory, the inventors understand that during the rotation, the feedstock comes into intimate contact with the porous liner. When the feedstock comes into contact with the porous liner, water is absorbed by the porous liner. The airflow travels through the hollow drum, some air permeates through the porous liner and out the perforations. As it passes through the porous liner, the airflow carries with it the evaporated water from the products and also aiding in the drying of the porous liner material. The liner is also dried by airflow around the outside of the perforated drum during rotation of the tube structure.

In one form of the present invention, the drum is adapted to rotate at steady speed, variable speed or in intermittent motion.

In a preferred form of the invention, the desiccation apparatus is adapted to treat feedstocks with a solids content of at least 1%. In a preferred form of the invention, the desiccation apparatus is adapted to treat feedstocks with a solids content of at least 2%. In a preferred form of the invention, the desiccation apparatus is adapted to treat feedstocks with a solids content of at least 4%. In a preferred form of the invention, the desiccation apparatus is adapted to treat feedstocks with a solids content of at least 6%. In a preferred form of the invention, the desiccation apparatus is adapted to treat feedstocks with a solids content of at least 8%. In a preferred form of the invention, the desiccation apparatus is adapted to treat feedstocks with a solids content of at least 10%. In a preferred form of the invention, the desiccation apparatus is adapted to treat feedstocks with a solids content of at least 12%. In a preferred form of the invention, the desiccation apparatus is adapted to treat feedstocks with a solids content of at least 14%. In a preferred form of the invention, the desiccation apparatus is adapted to treat feedstocks with a solids content of at least 16%. In a preferred form of the invention, the desiccation apparatus is adapted to treat feedstocks with a solids content of at least 18%. In a preferred form of the invention, the desiccation apparatus is adapted to treat feedstocks with a solids content of at least 20%.

In one form of the present invention, the interior of the hollow drum is provided with plurality of lifting means. Preferably the lifting means are mounted on the interior surface of the shell, extending inwardly therefrom. More preferably, the lifting means are adapted to continuously picking up and dropping the feed material in response to rotation of the hollow drum In one form of the present invention, two or more hollow drums may be used in parallel or series. In one form of the present invention, where two or more drums are used, rotation of any one drum may be actuated by at least one other drum.

In a accordance with a further aspect of the present invention, there is provided a method for the removal of water from a feedstock comprising water, the method comprising:

introducing the feedstock into a hollow drum mounted for revolution about a substantially horizontal axis, the drum being defined by a shell having an interior surface and an exterior surface;

generating an airflow through the hollow drum; and at least periodically rotating the hollow drum.

In a preferred form of the invention, the feedstock has a solids content of at least 1%. In a preferred form of the invention, the feedstock has a solids content of at least 2%. In a preferred form of the invention, the feedstock has a solids content of at least 4%. In a preferred form of the invention, the feedstock has a solids content of at least 6%. In a preferred form of the invention, the feedstock has a solids content of at least 8%. In a preferred form of the invention, the feedstock has a solids content of at least 10%. In a preferred form of the invention, the feedstock has a solids content of at least 12%. In a preferred form of the invention, the feedstock has a solids content of at least 14%. In a preferred form of the invention, the feedstock has a solids content of at least 16%. In a preferred form of the invention, the feedstock has a solids content of at least 18%. In a preferred form of the invention, the feedstock has a solids content of at least 20%.

Preferably, the volume of feedstock in the drum is controlled. Preferably, the volume of feedstock is controlled to between 5% and 40% of the internal volume of the drum. More preferably, the volume of feedstock is controlled to between 10% and 35% of the internal volume of the drum. More preferably, the volume of feedstock is controlled to between 15% and 30% of the internal volume of the drum. More preferably, the volume of feedstock is controlled to between 20% and 25% of the internal volume of the drum.

In one form of the present invention the speed of the airflow is at least 2 km/hr. In a preferred form of the invention, the airflow is at least 3 km/hr. In a preferred form of the invention, the airflow is at least 4 km/hr. In a preferred form of the invention, the airflow is at least 5 km/hr. In a preferred form of the invention, the airflow is at least 6 km/hr. In a preferred form of the invention, the airflow is at least 7 km/hr. In a preferred form of the invention, the airflow is at least 8 km/hr. In a preferred form of the invention, the airflow is at least 9 km/hr. In a preferred form of the invention, the airflow is at least 10 km/hr.

In a preferred form of the invention, the airflow is between 2 km/hr and 20 km/hr. In a preferred form of the invention, the airflow is between 4 km/hr and 19 km/hr. In a preferred form of the invention, the airflow is between 6 km/hr and 18 km/hr. In a preferred form of the invention, the airflow is between 8 km/hr and 17 km/hr. In a preferred form of the invention, the airflow is between 10 km/hr and 16 km/hr.

In one embodiment, the airflow is passed through the drum at a rate of at least 2.5 $m^3/s$. In one embodiment, the airflow is passed through the drum at a rate of at least 3 $m^3/s$. In one embodiment, the airflow is passed through the drum at a rate of at least 4 $m^3/s$. In one embodiment, the airflow is passed through the drum at a rate of at least 5 $m^3/s$. In one embodiment, the airflow is passed through the drum at a rate of at least 6 $m^3/s$. In one embodiment, the airflow is passed through the drum at a rate of at least 7 $m^3/s$. In one embodiment, the airflow is passed through the drum at a rate of at least 8 $m^3/s$. In one embodiment, the airflow is passed through the drum at a rate of at least 9 $m^3/s$. In one embodiment, the airflow is passed through the drum at a rate of at least 10 $m^3/s$. In one embodiment, the airflow is passed through the drum at a rate of at least 11 $m^3/s$. In one embodiment, the airflow is passed through the drum at a rate of at least 12 $m^3/s$. In one embodiment, the airflow is passed through the drum at a rate of at least 13 $m^3/s$. In one embodiment, the airflow is passed through the drum at a rate of at least 14 $m^3/s$. In one embodiment, the airflow is passed through the drum at a rate of at least 15 $m^3/s$. In one embodiment, the airflow is passed through the drum at a rate of at least 16 $m^3/s$. In one embodiment, the airflow is passed through the drum at a rate of at least 17 $m^3/s$. In one embodiment, the airflow is passed through the drum at a rate of at least 18 $m^3/s$. In one embodiment, the airflow is passed through the drum at a rate of at least 19 $m^3/s$. In one embodiment, the airflow is passed through the drum at a rate of at least 20 $m^3/s$. In one embodiment, the airflow is passed through the drum at a rate of at least 21 $m^3/s$. In one embodiment, the airflow is passed through the drum at a rate of at least 22 $m^3/s$. In one embodiment, the airflow is passed through the drum at a rate of at least 23 $m^3/s$. In one embodiment, the airflow is passed through the drum at a rate of at least 24 $m^3/s$. In one embodiment, the airflow is passed through the drum at a rate of at least 25 $m^3/s$. In one embodiment, the airflow is passed through the drum at a rate of at least 26 $m^3/s$. In one embodiment, the airflow is passed through the drum at a rate of at least 27 $m^3/s$. In one embodiment, the airflow is passed through the drum at a rate of at least 28 $m^3/s$. In one embodiment, the airflow is passed through the drum at a rate of at least 29 $m^3/s$. In one embodiment, the airflow is passed through the drum at a rate of at least 30 $m^3/s$.

In a preferred form, the volume of air that passed through the drum is between 10,000 to 100,000 $m^3/hr$.

In one form of the present invention the feedstock is selected from the group comprising pellets, powders, seeds, biomass matter, muds, sludges, lumps, slurry, suspensions, ores, concentrates and agglomerates. Preferably, the feedstock contains pellets.

In one form of the present invention the apparatus is continuously operated.

In an alternative form of the present invention, the apparatus is batch operated.

In one form of the present invention, the drum is adapted to rotate at steady speed, variable speed or in intermittent motion. Preferably, the drum is adapted to rotate at a rate of between 1 and 25 revolutions per minute.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
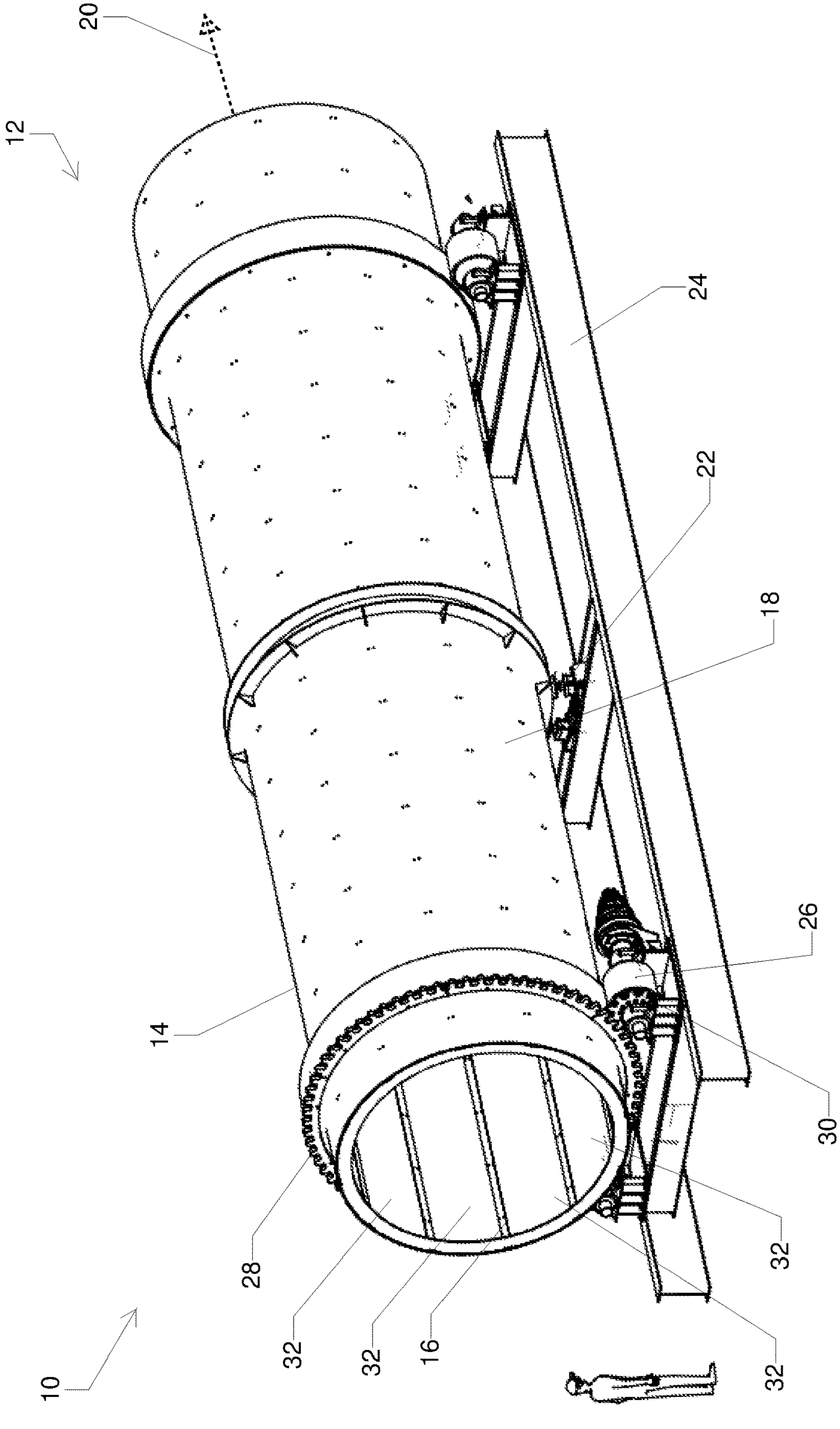
FIG. 1 is an upper perspective view of a desiccation apparatus in accordance with a first embodiment of the present invention.

In FIG. 1 there is shown a desiccation apparatus 10 in accordance with a first embodiment of the present invention. The desiccation apparatus 10 of the present invention comprises a hollow drum 12. The hollow drum is defined by an elongate shell 14 having a substantially horizontal axis. The shell 14 has an interior surface 16 which faces the inside of the hollow drum 12 and an exterior surface 18 which faces the outside of the hollow drum 12.

The hollow drum 12 is supported for rotation about a substantially horizontal axis 20. In the embodiment shown in FIG. 1, the cylindrical shell 14 is supported for rotation on a number of rollers 22. The rollers 22 are spread out along the length of the cylindrical shell 14. Is envisaged that as the length of the hollow drum 12 increases, additional rollers 22 may be required. In the embodiment shown in FIG. 1, the rollers 22 are mounted on a base structure 24.

Rotation of the hollow drum 12 is driven by a drive means, for example an electric motor 26. Suitable drive means include combustion motors, electric motors, hydraulic motors and prime mover direct drives. In the embodiment shown in the figures, a teeth track 28 is provided around the circumference of the hollow drum 12 to engage with the electric motor. To facilitate the engagement of the electric motor to the teeth track 28, the electric motor is coupled to a gear 30. In the embodiment shown in FIG. 1, the gear 30 directly engages with the teeth track 28 to rotate the hollow drum 12. Alternatively, it is envisaged that the gear 30 and the teeth track 28 may be engaged by way of chain (not shown) that surrounds both the gear 30 and the teeth track 28. Other conventional means of rotating the drum may be implemented without departing from the scope of the present invention. Rotation of the hollow drum 12 may be operated at steady speed, variable speed or in intermittent motion.

The interior surface of the shell 14 is lined with a liner 32. In a preferred embodiment, the liner 32 is constructed from a porous material. By lining the interior surface of the shell 14 with a porous liner 32, the feedstock will come into intimate contact with the porous liner 32 during operation of the desiccation apparatus 10. During this contact, the porous liner 32 will absorb liquid from the feedstock whilst rejecting solids. The inventors have found that a porous layer that is constructed from a porous material is particularly useful in the removal of liquid from the feedstock. As would be appreciated by a person skilled in the art, porous materials absorb liquid through a mechanism known as capillary action, also known as wicking. In this mechanism, the intermolecular forces between the liquid and surrounding solid surfaces cause liquid to be drawn into the pores of the porous material. It is envisaged that the porous liner 32 can be constructed from any material that can be adapted to absorb liquids. Examples include a wide range of woven and non-woven fabrics, rubber, plastic, ceramic, wood, cement, concrete or brick liners. A particularly useful material used to construct the porous liner 32 is a geosynthetic textile. Such materials comprise a woven or non-woven textile constructed from synthetic fibres. Materials that have been found to be particularly useful by the inventors include Texcel™, Bidim™, Mirafi™ and Megaflow™ GT500 and GT 750 supplied by Tecate™ and GEOFABRICS AUSTRALASIA PTY LTD.

In order to ensure efficient removal of the liquid from the feedstock, it is recommended to maximise throughput that at least 50% of the interior of the shell 14 should be lined with a porous liner 32.

The pore size of the porous liner 32 is between 2 microns and 100 microns. As would be appreciated by a person skilled in the art, the size of the pores needs to be sized to provide the required capillarity or surface tension to retain liquids in the pores of the porous layer.

The thickness of the porous liner 32 is usually 1 mm to 10 mm thick but preferably 3 mm to 6 mm in thickness depending upon the type of material is used to construct the porous liner 32. Generally, a thicker porous liner 32 is required when the porous liner 32 is constructed from a material that is susceptible to being damaged by the solids in the feedstock.

The apparatus further comprises a means to generate an airflow through the hollow drum 12. The preferred airflow direction is parallel to the horizontal axis of the drum over the wet feedstock. It is envisaged that the airflow can be generated by a fan, blower, vacuum or by differential pressure. The inventors have found that the airflow generated through the drum will enhance the rate of evaporation of volatile liquids, such as water, from the feedstock. Without wishing to be bound by theory, the inventors believe that as water evaporates into the atmosphere of the desiccation apparatus as water vapour, the airflow will continually direct the water vapour out of the desiccation apparatus. This is understood to increase the rate of evaporation of water from the feedstock whilst also preventing the recondensation of water vapour.

The hollow drum 12 may be mounted on a slightly decline position to allow for gravity to move the feedstock along the length of the hollow drum 12 during rotation. It is envisaged that the movement of the feedstock along the length of the drum will increase the contact of the feedstock with the airflow and the porous liner 32, thereby increasing the rate in which liquids are removed from the feedstock by evaporation or wicking.

The desiccation apparatus further comprises a feed inlet (not shown). The feed inlet provides a point at which the feedstock may be introduced into the interior of the hollow drum 12. It is envisaged that the feed inlet may be in communication with a hopper or other storage vessel to introduce the feedstock into the hollow drum 12 at a controlled rate. The desiccating further comprises an outlet adapted to discharge the dried material from the interior of the hollow drum 12. The feed inlet and the outlet are provided at opposing end of the hollow drum 12, thereby allowing the feedstock to travel the length of the hollow drum 12. This maximises the contact time between the feedstock and the porous liner 32. Where the hollow drum 12 is positioned on an inclined position, the feed inlet is provided at the inclined end of the hollow drum 12, with the outlet positioned at the declined end. In this arrangement, gravity will slowly move the feedstock between the feed inlet and the outlet by cascade and finally discharged by overflow.

The interior of the hollow drum 12 may be provided with plurality of lifting means that are mounted on the interior surface of the shell 14, extending inwardly therefrom. As would be appreciated by a person skilled in the art, the lifting means are adapted to continuously pick up and drop the feedstock in response to rotation of the hollow drum 12. This in turn increases the mixing of the feedstock and exposing the feedstock to the airflow and the porous liner 32, thereby increasing the rate in which liquids are removed from the feedstock by evaporation or wicking. The use of lifting and turning the feedstock by the means of "lifters" is more applicable to discrete solid particles where the interior of the feedstock would normally not be exposed to the porous liner 32.

The desiccation apparatus further comprise a drainage means (not shown) provided underneath the hollow drum 12. The drainage means is shaped so as to catch any liquids expelled by the hollow drum 12 and direct them to an appropriate recycle, storage or disposal means. One or more filter may be associated with the drainage means.

During operation of the desiccation apparatus, the feedstock is gently tumbled in the hollow drum 12 as it rotates. During the rotation, the feedstock comes into intimate contact with the porous liner 32. When the feedstock comes into contact with the porous liner 32, water is absorbed by the porous liner 32. The airflow travels through the hollow drum 12, to evaporate water from the feedstock and some air also contacts the fabric not covered by feedstock.

It is envisaged that the desiccation apparatus may be adapted to operate in either a batch configuration or a continuous configuration. In a batch operation, a finite amount of feedstock is loaded into the hollow drum 12 through the feedstock inlet and the desiccation apparatus is operated. Once the feedstock has been sufficiently dried, the operation of the desiccation apparatus is ceased and the dried material is removed from the outlet.

In continuous configuration, the feedstock is continuously fed into the feedstock inlet during operation of the desiccation apparatus and the dried material is withdrawn through the outlet. In operation, it is envisaged that the feedstock will need to be fed into the feedstock inlet at a controlled rate to allow sufficient time for the feedstock to lose excess surface water to the airflow and the porous medium Furthermore, it is envisaged that by providing the hollow drum 12 in an inclined position, the feedstock may move along the hollow drum 12 from the feedstock inlet to the outlet under influence of gravity by cascading down the drum as the drum is rotated. The extent of water removal can likewise be controlled by controlling the contact time between the feedstock and the porous liner 32.

It is envisaged that two or more hollow drums 12 may be used in parallel or series. It is envisaged that series operation may operate in a multiple pass type arrangement with different process conditions for subsequent hollow drum 12*s*. Furthermore, a hollow drum 12 can consist of cylinders of different diameters joined together or running adjacent to each other feeding product from one cylinder to the next. It is envisaged that parallel operation will allows a higher throughput of feedstock processing.

The inventors envisage that the desiccation apparatus is suitable to treat feedstocks selected from pellets, powders, seeds, muds, sludges, lumps, mashes, aggregates, slurry, suspensions or agglomerates.

The desiccation apparatus is adapted to treat feedstocks with a solids content of at least 1% but preferably a minimum of 12% solids.

It is envisaged that additional products can be added separately into the hollow drum 12 to aid with the overall process such as dry solids, powders, liquids, chemicals or adsorbents.

Figure 2:
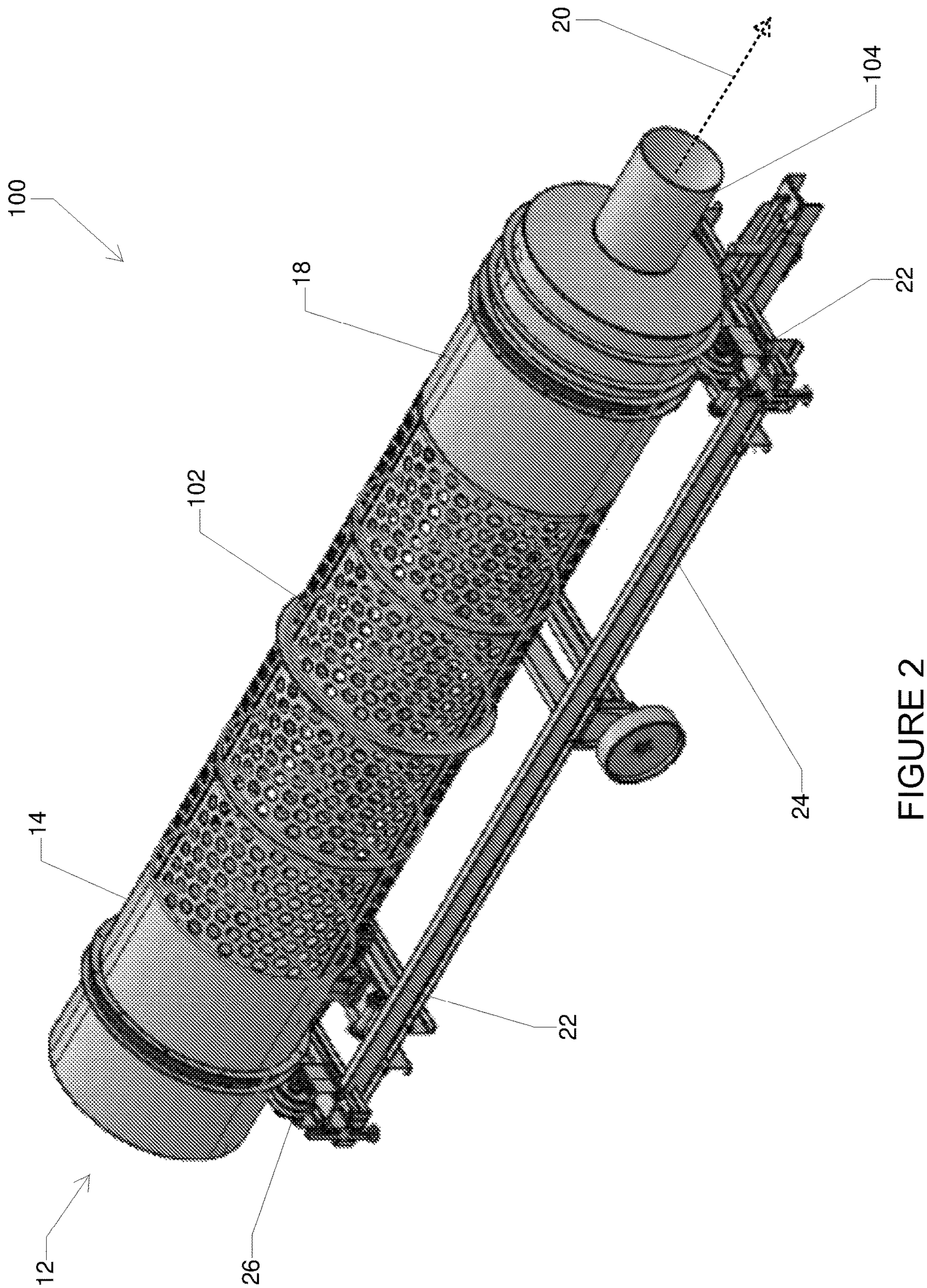
FIG. 2 is an upper perspective view of a desiccation apparatus in accordance with a second embodiment of the present invention.

In FIG. 2 there is shown a desiccation apparatus 100 in accordance with a further aspect of the present invention. Desiccation apparatus 100 shares many features with desiccation apparatus 10 and like numerals denote like parts.

In the embodiment shown in FIG. 2, the shell 14 is provided with a number of perforations 102. The perforations are provided at regular intervals around the circumference of the hollow drum 12 and at regular intervals along the length of the hollow drum 12. The perforations permit communication between the interior of the hollow drum 12 and the exterior. Whilst not shown in FIG. 2, the use of a porous liner 32 is particularly useful when the drum 12 is provided with perforations. In this embodiment, the perforations provide an additional means by which absorbed liquids may be removed from the porous liner 32. Furthermore, the airflow generated through the interior of the drum 12 may pass through the pores of the porous liner 32 and out the perforations. As it passes through the porous liner 32, the airflow carries with it the removed water, thereby evaporating it from the porous material. The action of the rotating drum 12 generates airflow on the outside of the drum 12 which has also been found to assist in the evaporation of water from the wet or damp porous liner 32. During operation, the porous liner 32 will contact the feedstock and wick water away from the feedstock. As the drum 12 is rotated, the wet or damp porous liner 32 will cease contact with the feedstock thereby by allowing the water held within the porous liner 32 to evaporate. As the drum 12 completes a full revolution and the porous liner 32 is again in contact with the feedstock, further water is wicked into the porous liner 32.

The inventors have found that the efficiency of the desiccation apparatus 100 is increased when the volume of feedstock within the drum 12 is maintained to between 10% and 50% of the internal volume of the drum 12. This has been found to permit a sufficient volume of air to flow over the feedstock permit evaporation of the water. To maintain a suitable volume of feedstock, the outlet of the drum 12 may be partially capped. In the embodiment shown in FIG. 2, the end is partially capped by a funnel piece 104. The funnel piece 104 provides an outlet with a reduced size. This arrangement has been found to permit the dried feedstock to slowly exit the drum 12 in an overflow manor.

Example 1

A desiccation apparatus in accordance with an embodiment of the present invention was tested to determine the rate of evaporation of water from a sewage sludge feedstock.

The desiccation apparatus used had an internal diameter of 1 m and a length of 4 m. The interior surface of the drum was lined with a porous liner constructed from polyethylene fibres. The pore size of the liner was less than 75 μm (AS 3706.7). The thickness of the liner was 6 mm.

Ambient temperature air was passed through the drum was 8-10 $m^3$/sec. The drum was rotated as a rate of 2 revolutions per minute and was periodically stopped every 30 seconds to 1 minute for 5 to 10 minutes.

The water content was periodically measured and the results are shown in Table 1 below.

TABLE 1

| Water Content Measurements | | | | | | |
|---|---|---|---|---|---|---|
| Time (days) | Ambient Air Temp (° C.) | Ambient Air Humidity | Air Speed (km/hr) | Discharge Air Temp (° C.) | Discharge Air Humidity | Product Water Content |
| 0 | | | | | | 85% |
| 1 | 20 | 46 | 10 | 11 | 56 | 75% |
| 2 | 20 | 43 | 11 | 12 | 59 | 62% |
| 3 | 22 | 34 | 11 | 12 | 58 | 50% |
| 4 | 21 | 32 | 11 | 13 | 57 | 38% |
| 5 | 23 | 33 | 11 | 14 | 54 | 22% |
| 6 | 22 | 32 | 11 | 17 | 45 | 16% |
| 7 | 21 | 40 | 11 | 17 | 45 | 13% |
| 8 | 22 | 38 | 11 | 19 | 42 | 12% |

The results show that the apparatus successfully reduced the liquids content from 85% to 12% over a period of 8 days. As can be noted from the above, this test was undertaken with an ambient temperature of 20-23° C. It should be noted that the apparatus achieved a significant reduction of the water content in relatively mild ambient conditions and without the need for any heating of the air or the interior of the drum.

Example 2

A series of tests were undertaken to determine the effect that different liner materials had on the rates of evaporation.

Four different lining materials were lined on the interior surface of the desiccation apparatus in accordance with one embodiment of the present invention. The desiccation apparatus used had an internal diameter of 1 m and a length of 4 m. The volume of air passed through the drum was 8 to 10 $m^3$/sec. The drum was rotated as a rate of 2 revolutions per minute and was periodically stopped every 30 seconds to 1 minute for 5 to 10 minutes.

Details of the four liners tested are provided in Table 2.

TABLE 2

| Test Criteria | | | | |
|---|---|---|---|---|
| Trial | Test 1 | Test 2 | Test 3 | Test 4 |
| Liner Material | HDPE Plastic | Conveyor belt | Polyethylene fabric | Polypropylene fabric |
| Liner Thickness | 2 mm | 8 mm | 4 mm | 6 mm |
| Pore size (AS 3706.7) | 0 | 0 | <75 μm | <75 μm |
| Pore size (ASTM 6767) | 0 | 0 | 182 μm | 124 μm |
| Coefficient of permeability (AS 3706.9) | 0 | 0 | 48 m/s $10^{-4}$ | 34 m/s $10^{-4}$ |

The feed materials had a starting water concentration of 85%. The apparatus was operated and the water content was measured daily to track the water loss. The results are shown in Table 3 below.

TABLE 3

| Water content measurements | | | | |
|---|---|---|---|---|
| Days | Test 1 Water (%) | Test 2 Water (%) | Test 3 Water (%) | Test 3 Water (%) |
| 0 | 85 | 83 | 85 | 84 |
| 1 | 75 | 73 | 75 | 77 |
| 2 | 68 | 65 | 62 | 60 |
| 3 | 62 | 58 | 50 | 53 |
| 4 | 56 | 51 | 38 | 40 |
| 5 | 50 | 44 | 22 | 27 |
| 6 | 44 | 36 | 16 | 20 |
| 7 | 38 | 29 | 13 | 16 |
| 8 | 32 | 22 | 12 | 13 |
| 9 | 26 | 15 | | 12 |
| 10 | 20 | 12 | | |
| 11 | 14 | 11 | | |
| 12 | 12 | 12 | | |

As can be seen from the results, whilst non-porous liners still permitted the evaporation of water from the feedstock, the porous fabric liners demonstrated increased evaporation rates over the non-porous materials.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

The invention claimed is:

1. A desiccation apparatus, the apparatus comprising:

a hollow drum mounted for revolution about a substantially horizontal axis, the drum being defined by a shell having an interior surface and an exterior surface, the shell includes a plurality of perforations arranged therethrough;

a porous liner provided on at least a portion of the interior surface of the shell, wherein the porous liner is capable of absorbing fluid and preventing solids from passing therethrough, where the perforations in the shell are in communication with the porous liner; and at least one of a fan, air blower, vacuum or suction device to generate airflow through the hollow drum in a direction parallel to an elongate axis of the drum.

2. A desiccation apparatus according to claim 1, wherein the desiccation apparatus is adapted to remove water and other liquids from a wet feedstock, thereby reducing the liquid content of the feedstock.

3. A desiccation apparatus according to claim 1, wherein the porous liner is constructed from at least one of porous textiles, porous fabrics, porous rubbers, porous plastics, porous ceramics, porous wood, porous cement, porous concrete or porous brick.

4. A desiccation apparatus according to claim 1, wherein the liner is a woven or non-woven textile.

5. A desiccation apparatus according to claim 1 wherein the liner covers at least 50% of the interior surface.

6. A desiccation apparatus according to claim 1, wherein the ratio of the diameter of the drum to the length of the drum is between 1:2.5 and 1:10.

7. A desiccation apparatus according to claim 1, wherein the desiccation apparatus further comprises a feed inlet.

8. A desiccation apparatus according to claim 1, wherein the desiccation apparatus further comprises an outlet.

9. A desiccation apparatus according to claim 1, wherein the desiccation apparatus further comprises a rotating means for controllably rotating the hollow drum.

10. A desiccation apparatus according to claim 1, wherein the porous liner is axially aligned with at least a portion of the plurality of perforations of the shell.

11. A method for the removal of water from a feedstock comprising water, the method comprising:

introducing the feedstock into a hollow drum mounted for revolution about a substantially horizontal axis, the drum being defined by a shell having an interior surface and an exterior surface the shell includes a plurality of perforations arranged therethrough, wherein a porous liner is provided on at least a portion of the interior surface, wherein the porous liner is capable of absorbing fluid and preventing solids from passing therethrough, and the plurality of perforations are in communication with the porous liner;

generating an airflow through the hollow drum in a direction parallel to an elongate axis of the drum; and at least periodically rotating the hollow drum.

12. A method according to claim 11, wherein the volume of feedstock is controlled to between 5% and 40% of the internal volume of the drum.

13. A method according to claim 11, wherein the airflow has speed of at least 2 km/hr.

14. A method according to claim 11, wherein the airflow is passed through the drum at a rate of at least 2.5 $m^3/s$.

15. A method according to claim 11, wherein the feedstock-includes is at least one of pellets, powders, seeds, biomass matter, muds, sludges, lumps, slurry, suspensions, ores, concentrates or agglomerates.

16. A method according to claim 11, wherein the drum is continuously operated or batch operated.

17. A method according to claim 11, the method comprising rotating the drum at a rate of between 1 and 25 revolutions per minute.

18. A method according to claim 11, wherein the porous liner is axially aligned with at least a portion of the plurality of perforations of the shell.

* * * * *